(12) United States Patent
Ervin et al.

(10) Patent No.: US 6,345,149 B1
(45) Date of Patent: Feb. 5, 2002

(54) UV OVEN FOR CURING MAGNET WIRE COATINGS

(75) Inventors: Robert Ervin, Gaithersburg; Charles Synborski, Monrovia; Ed Lewallen, Gaithersburg, all of MD (US)

(73) Assignee: Fusion UV Systems, Inc., Gaithersburg, MD (US)

( * ) Notice: Subject to any disclaimer, the term of this patent is extended or adjusted under 35 U.S.C. 154(b) by 0 days.

(21) Appl. No.: 09/697,047

(22) Filed: Oct. 27, 2000

Related U.S. Application Data

(60) Provisional application No. 60/161,711, filed on Oct. 27, 1999.

(51) Int. Cl.[7] .................................................. B02D 3/06
(52) U.S. Cl. ........................ 392/417; 392/423; 427/493; 427/513; 250/504 R; 118/641
(58) Field of Search ................. 392/417, 411, 392/423; 427/493, 513; 250/492.1, 504 R; 118/641–643; 219/388; 34/275–278, 273, 274

(56) References Cited

U.S. PATENT DOCUMENTS

| | | | | |
|---|---|---|---|---|
| 2,299,239 A | * | 10/1942 | Jordan et al. ................ | 392/417 |
| 3,984,726 A | * | 10/1976 | Ramler ........................ | 315/107 |
| 4,591,724 A | * | 5/1986 | Fuse et al. ................ | 250/492.1 |
| 4,636,405 A | * | 1/1987 | Mensah et al. ............. | 427/493 |
| 4,710,638 A | * | 12/1987 | Wood ....................... | 250/492.1 |
| 4,798,960 A | * | 1/1989 | Keller et al. ............. | 250/504 R |
| 4,831,268 A | * | 5/1989 | Fisch et al. ............. | 250/432 R |
| 4,913,859 A | * | 4/1990 | Overton et al. ............ | 264/1.27 |
| 5,092,264 A | * | 3/1992 | Overton et al. ............ | 118/50.1 |
| 5,733,607 A | * | 3/1998 | Mangum et al. | |
| 6,083,387 A | * | 7/2000 | LeBlanc et al. ............ | 210/199 |

FOREIGN PATENT DOCUMENTS

| | | | |
|---|---|---|---|
| DE | 938499 | * | 2/1956 |
| FR | 2629187 | * | 9/1989 |
| GB | 586425 | * | 3/1947 |
| GB | 870061 | * | 6/1961 |
| GB | 1252350 | * | 11/1971 |
| GB | 1565654 | * | 4/1980 |
| JP | 59-111953 | * | 6/1984 |
| JP | 3-67417 | * | 3/1991 |

\* cited by examiner

Primary Examiner—John A. Jeffery
(74) Attorney, Agent, or Firm—Shlesinger, Arkwright & Garvey LLP

(57) ABSTRACT

An UV oven comprises a compact longitudinal elliptical reflector with first and second focal lines; a longitudinal small diameter bulb disposed along the first focal line that generates short wavelength UV radiation, IR radiation, visible radiation and heat to cure the coating on magnet wires or wire-like elements that are passed through the other focal line. The inside surface of the reflector is coated with material to enhance the reflectivity of the short wavelength UV, IR and visible radiation.

19 Claims, 5 Drawing Sheets

UV OVEN FOR CURING MAGNET WIRE COATINGS

RELATED APPLICATION

This is a nonprovisional application of provisional application serial No. 60/161,711, filed on Oct. 27, 1999.

FIELD OF THE INVENTION

The present invention generally relates to apparatus for curing coating materials, and more particularly to apparatus for irradiating the coating on a magnet wire or wire-like element using UV and IR radiation, visible light and convective heat.

BACKGROUND OF THE INVENTION

Magnet wire is single strand copper wire with a hard thin protective coating bonded to the wire. The physical properties of the baked-on coating determine the dielectric strength, thermal rating, and resistance to damage of the wire. The wire is typically used for winding transformers, motors and solenoid coils.

Magnet wire coatings are bonded to the wire by baking them in convection ovens. The finished wire consists of 15 to 30 thin coatings that are each baked on before the next layer is applied. The process is not energy efficient.

The wire is dragged through weakly pressurized dies to apply the first layer of coating. After coating, the wire passes through a long drying oven (45–55 ft) and is cooled subsequently in a long cooling tunnel. The wire must be cooled to eliminate wet-coating vaporization. The wire is then circulated back for the next of 14 to 29 coating passes. Process speeds are limited by the thermal inertia of heating the copper wire and the number of coating passes, which is determined by the coating thickness. The larger the wire, the longer the oven and cool down tunnel. Speeds drop dramatically with increases in wire size.

OBJECTS AND SUMMARY OF THE INVENTION

It is an object of the present invention to provide an apparatus for curing the coating on magnet wires or wire-like elements that obviates the disadvantages of the prior art.

It is another object of the present invention to provide an apparatus that generates UV radiation, visible radiation, infrared radiation and convective heat to cure the coating on magnet wires or wire-like elements.

In summary, the present invention provides a UV oven comprising a compact longitudinal elliptical reflector with first and second focal lines; a longitudinal small diameter bulb disposed along the first focal line that generates short wavelength UV radiation, IR radiation, visible radiation and heat to cure the coating on magnet wires or wire-like elements that are passed through the other focal line. The inside surface of the reflector is coated with material to enhance the reflectivity of the short wavelength UV, IR and visible radiation. The bulb envelope is made of quartz material that allows transmission of short wavelength UV radiation. The small diameter bulb has been found to increase the power output in the short wavelength UV range.

In another embodiment of the invention, two separate compact elliptical longitudinal reflectors are used, each provided with a bulb. The magnet wires or wire-like elements to be cured are passed along the common focal line of the reflectors, subjecting the wires to the energy output of the two bulbs.

In yet another embodiment of the invention, the magnet wires or wire-like elements are placed even closer to the bulb. A compact elliptical longitudinal reflector includes a longitudinal bulb disposed along a focal line of the reflector. A back reflector is disposed in close proximity to the bulb. The wires to be cured are passed between the bulb and the back reflector.

These and other objects of the present invention will become apparent from the following detailed description.

BRIEF DESCRIPTIONS OF THE DRAWINGS

DETAILED DESCRIPTION OF THE INVENTION

Figure 1:
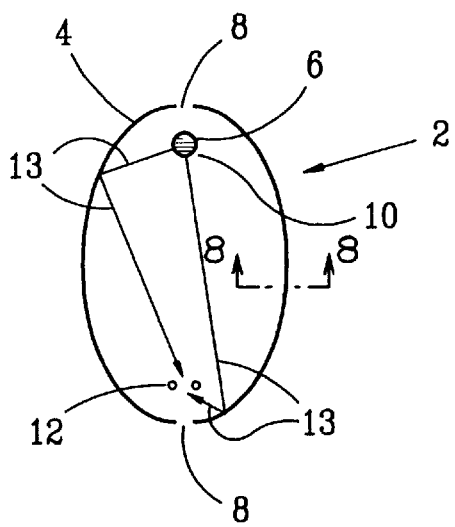
FIG. 1 is cross-sectional view through a UV oven made in accordance with the present invention.

An UV oven 2 made in accordance with the present invention is disclosed in FIG. 1. The oven 2 comprises a compact elliptical reflector 4. The reflector 4 is shown in cross-section, and it should be understood that the reflector is longitudinal extending perpendicular to the plane of the figure. Slots 8 are disposed at the top and bottom of the reflector for cooling a longitudinal bulb 10 disposed along one of the focal lines of the reflector 4. A pair of magnet wires 12 or wire-like elements with coatings to be cured are passed longitudinally substantially along the other focal line of the reflector 4.

The reflector 4 is preferably made compact to allow locating the magnet wires 12 in the other focal line as close to the bulb 6 as possible. This configuration advantageously shortens the distance and thereby lessens the attenuation of the short wavelength UV radiation as it traverses the air to reach the magnet wires. By using a compact elliptical reflector, the magnet wires can be located closer to the bulb 6 and still be in the optical focus, which is the zone of highest radiant flux. In addition, the compact nature of the reflector allows much of the convective heat provided by the bulb 6 to reach the magnet wires. For illustration purposes, the reflector 4 would have a major diameter of 92.2 mm and minor diameters of 71.6 mm.

Lines 13 depict the path of the UV, IR and visible radiation generated by the bulb 6 as they are reflected within the reflector 4.

Figure 2:
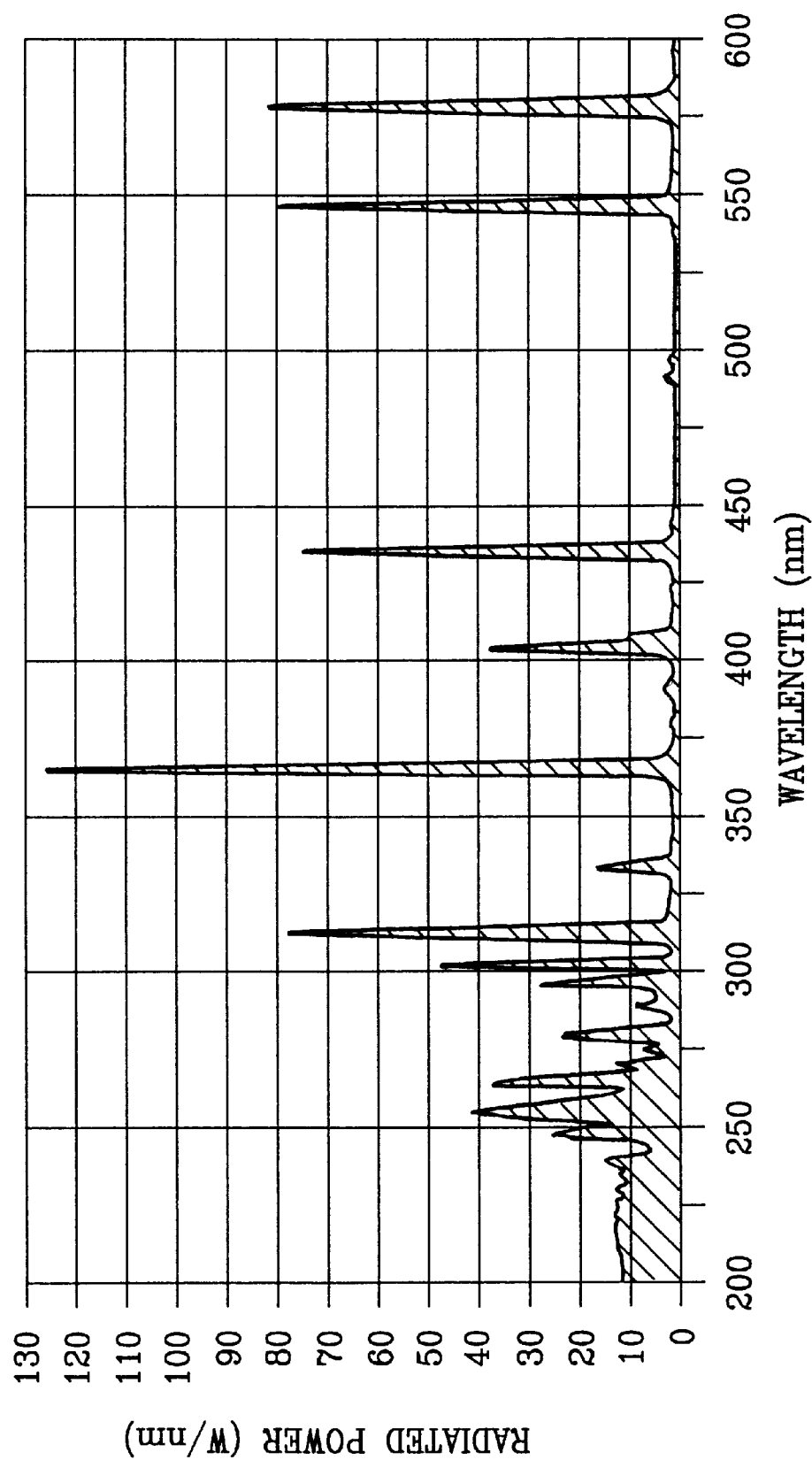
FIG. 2 is a graph of total spectral radiant flux output of a bulb used in the invention.
Figure 3:
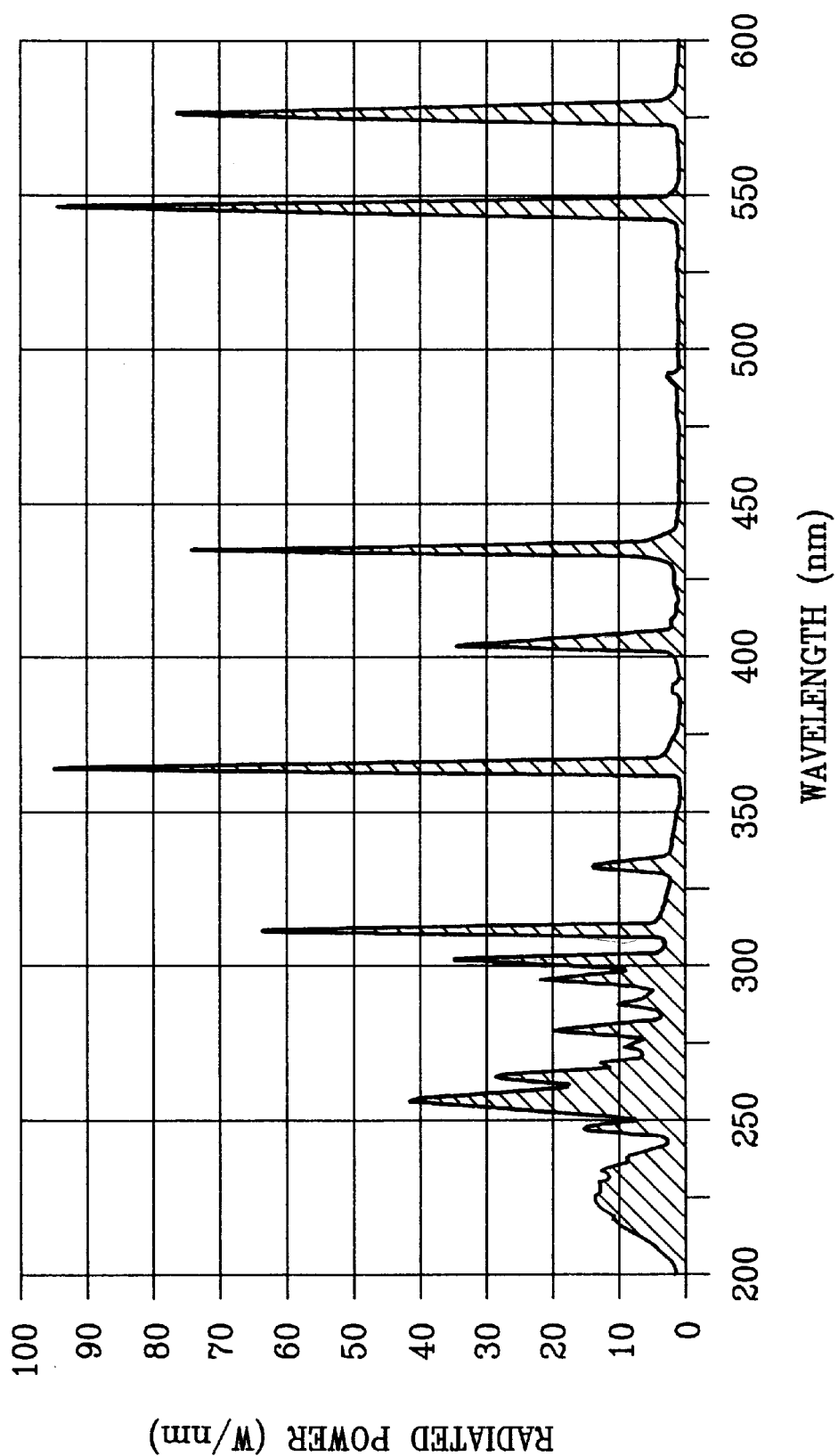
FIG. 3 is a graph of total spectral radiant flux output of a standard bulb.

The bulb 6 is chosen to produce greater short wavelength UV power than a standard bulb. The bulb fill includes mercury and argon or other materials suitable for production of short wavelength UV radiation. The bulb is a standard Fusion Aetek UV Systems, Inc., Romeoville, Ill., bulb, Model No. 07-01220, which has been modified with a different envelope material, as discussed below. The bulb 6 has a small diameter, about 15 mm inside diameter, which has been found to generate more power in the short wavelength UV range of 200–250 nm than a larger diameter standard bulb. Referring to FIG. 2, it can be seen that the bulb 6 generates more power in the 200–250 nm range of the spectrum, considered the short wavelength UV range, in comparison to a 22 mm inside diameter standard bulb (Fusion UV Systems, Inc. bulb, Model No. 07-01072), as shown in FIG. 3.

Figure 4:
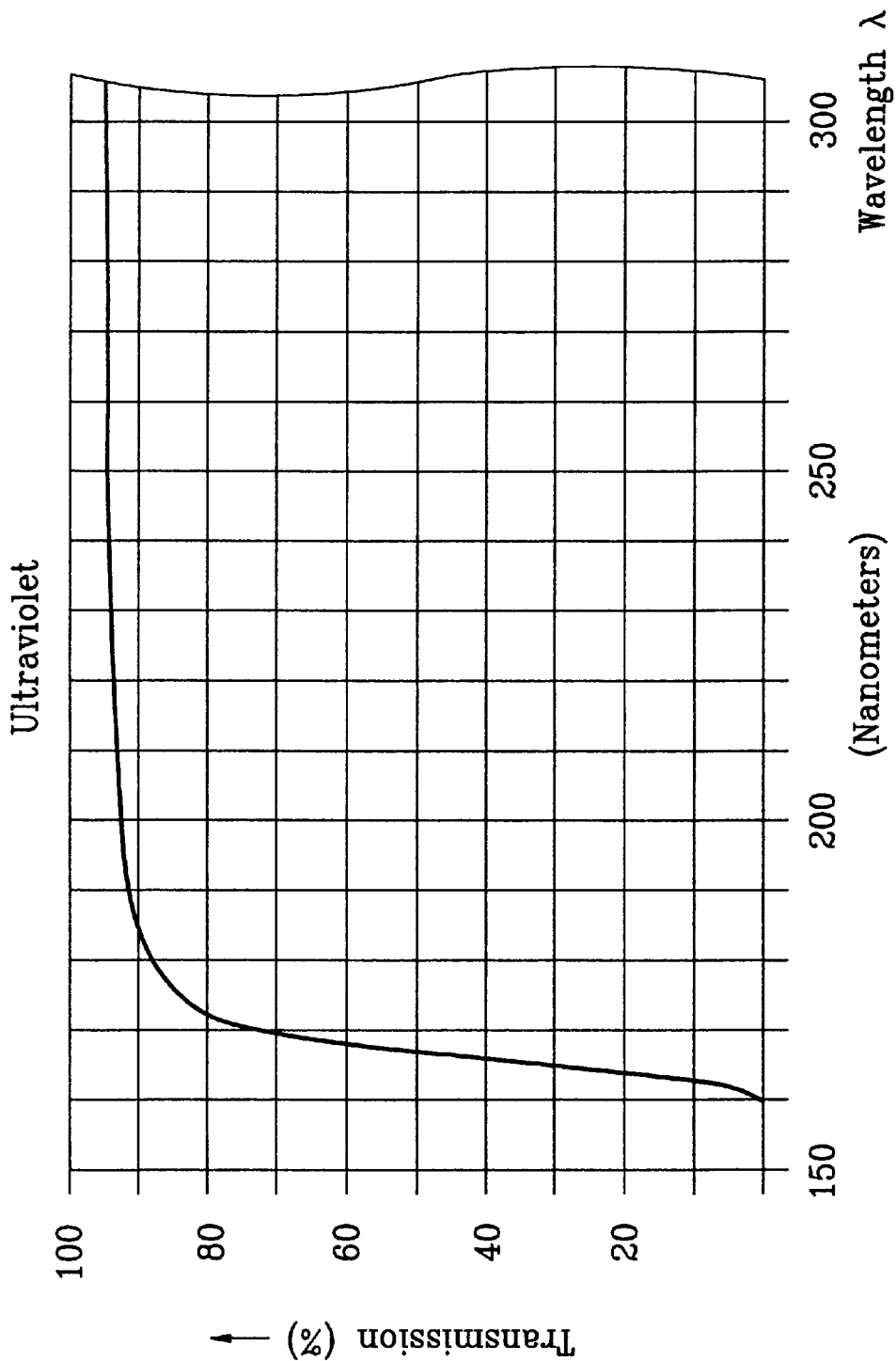
FIG. 4 is a graph of optical transmission in the short wavelength UV range for a bulb envelope used in the invention.

The bulb 6 uses a quartz material for its envelope that transmits well from below 180 nm, as generally shown in FIG. 4. A standard bulb quartz envelope attenuates the short wavelength UV radiation significantly. The quartz material used in the bulb 6 is available from Heraeus-Emersil, Buford, Ga., under the trademark SUPERSIL.

Figure 8:
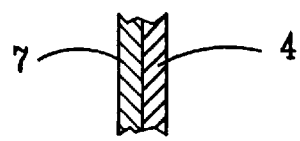
FIG. 8 is an enlarged fragmentary cross-sectional view taken along line 8–8 of FIG. 1.
Figure 5:
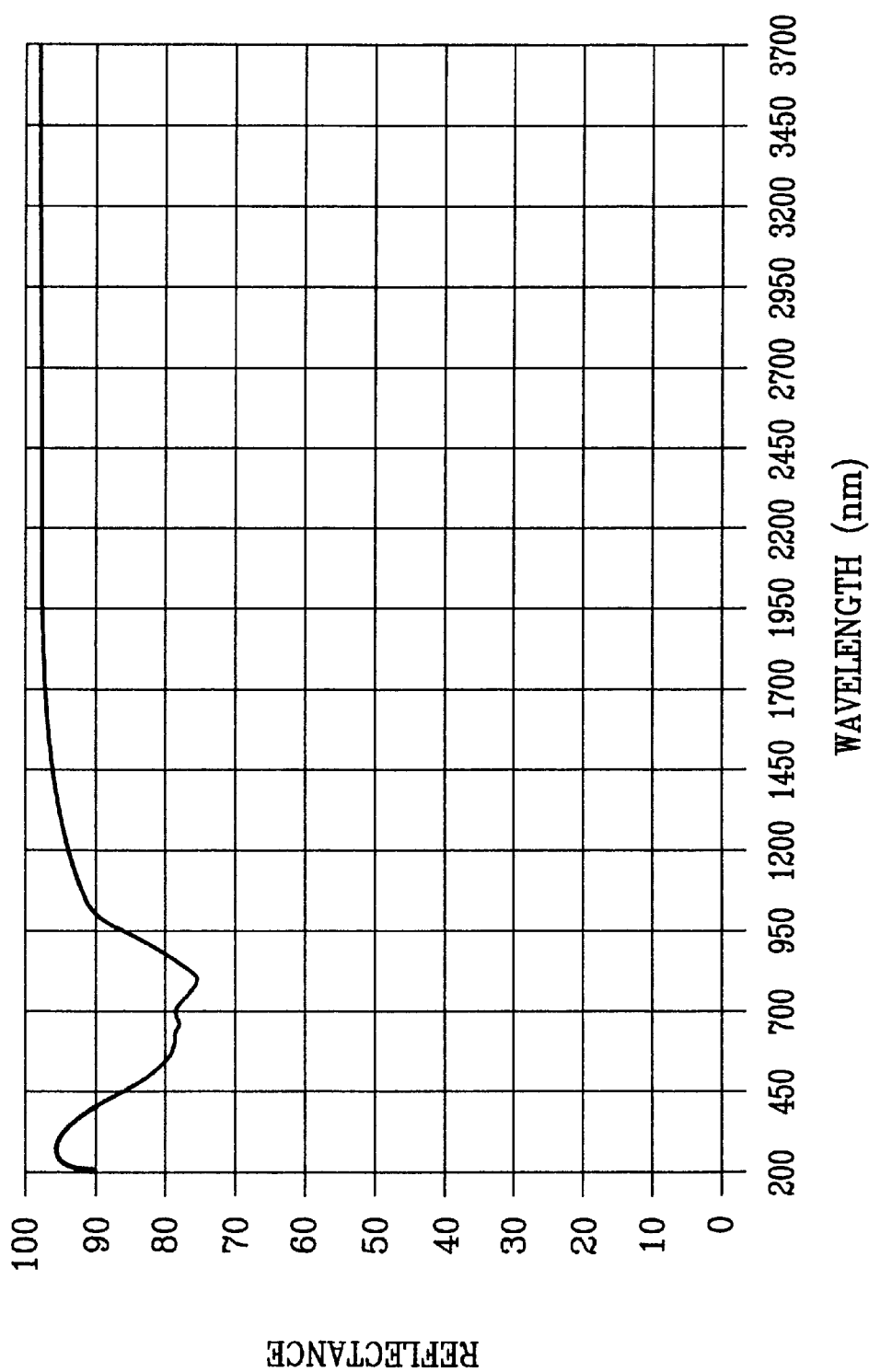
FIG. 5 is a reflectance spectrum of a coating used in the present invention to enhance reflectance of short wavelength UV radiation, visible light and infrared radiation.

The inside surface of the reflector 4 is coated with a material 7 (see FIG. 8) that improves the reflectivity throughout all usable wavelengths through the infrared portion of the spectrum, as best shown in FIG. 5. The coating material is available from Newport Thin Films Laboratory, Chino, Calif. Referring to FIG. 5, high reflectance is achieved by the coating in the general UV (200–400 nm), including the short wavelength UV (below 250 nm), visible (400–800 nm) and infrared (above 800 nm) part of the spectrum.

Figure 6:
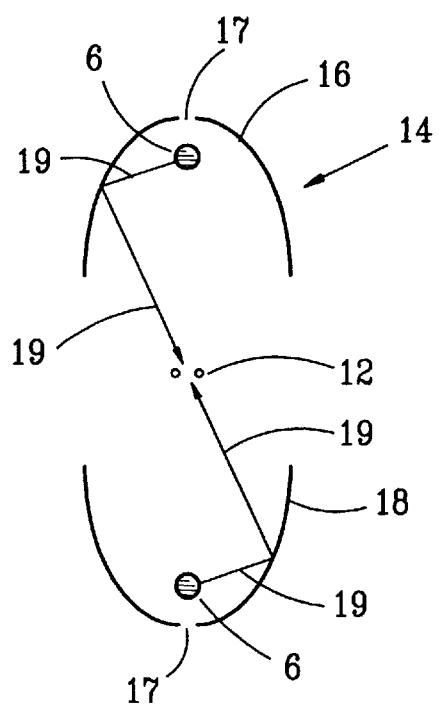
FIG. 6 is a cross-sectional view of another embodiment of the present invention.

Another embodiment of the present invention is disclosed in FIG. 6. An UV oven 14 comprises opposed first and second elliptical reflectors 16 and 18, which are longitudinal, extending perpendicular to the plane of the figure. As in the other embodiment of FIG. 1, the reflectors 16 and 18 are compact to allow the placement of the magnet wires 12 or wire-like elements close to the bulb 6. The bulb 6 is associated with each reflector and is disposed at respective focal line, as best shown in FIG. 6. The magnet wires 12 or wire-like elements to be treated are passed substantially along the other focal line which is common to each of the reflectors 16 and 18. In this embodiment, it will be understood that substantially more power is available at the common focal line for curing the wires. The reflectors 16 and 18 are coated with the same material as the reflector 4 to enhance the reflection of the usable radiation used in the process. Slots 17 disposed adjacent the bulbs 6 are used to cool the bulbs. Lines 19 depict the path of the UV, IR and visible radiation generated by the bulb 6 as they are reflected within the reflectors 16 and 18.

Figure 7:
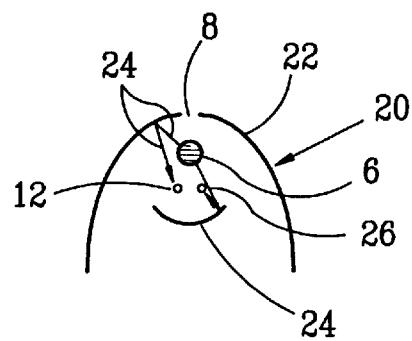
FIGS. 7 is a cross-sectional view of yet another embodiment of the present invention.

Yet another embodiment of the present invention is disclosed in FIG. 7. An UV oven 20 comprises a compact elliptical reflector 22 that extends longitudinally in a direction perpendicular to the plane of the figure. The bulb 6 is disposed along the focal line of the reflector. As in the other embodiments, the reflector 22 is coated with a coating material to enhance the reflection of the radiation used in the curing process. The magnet wires 12 or wire-like elements to be cured are disposed in much closer proximity to the bulb 6 than in the other embodiments. A back mirror 24, preferably curved toward the bulb, is disposed below the magnet wires 12 to reflect the radiation from the bulb toward the magnet wires 12, thereby irradiating the back side of the wires. The surface of the mirror 24 directed towards the bulb 6 is coated with the same material as the reflectors in the other embodiments to enhance the reflectivity of wavelength UV radiation and other radiation used in the process. Lines 26 depict the path of the UV, IR and visible radiation generated by the bulb 6 as they are reflected within the reflector 22.

Although the magnet wires 12 are already disposed close to the bulb 6 as in the other embodiments, due to the compact nature of the reflectors, the magnet wires 12 in the UV oven 20 are disposed even closer to the bulb 6, thereby taking advantage of the high heat energy source available close to the bulb 6 and decreasing the attenuation of the short wavelength UV radiation as it travels through the air.

In the embodiment of the oven 20, since the magnet wires 12 are not located in a focal line, and thus, do not take advantage of the concentration of the energy available at the focal line, the reflector 22 need not be elliptical. The reflector 22 can be cylindrical or any suitable shape designed to direct the energy of the bulb toward the wires.

The apparatus of the present invention irradiates the coating on the magnet wires 12 with short wavelength UV radiation and simultaneously heats the coating with radiant IR energy and convection heat generated by the plasma in the bulb fill. The short wavelength UV radiation generated by the bulb 6 is used to activate the photoinitiators in the coating.

By using a small diameter quartz envelope for the bulb 6, typically in the neighborhood of 15 mm inside diameter, controlling the amount of mercury and argon in the bulb to provide maximum short wavelength UV radiation, and using a type of quartz that transmits well in the short wavelength UV range, the short wavelength UV radiation generated is increased.

The apparatus of the present invention allows for thicker coatings and instant curing of the coating. This virtually eliminates the link between process cure speed and wire size. The thicker coatings allow the number of passes in the oven to be reduced from 15 to 30 down to about 1 to 3. The size of the apparatus is about ½oth of the conventional bake and cool chambers of the prior art. The cooling tunnel used in the prior art is advantageously completely eliminated.

The present invention advantageously reduces energy consumption, factory floor space, labor, VOC's and the number of passes through the oven. It also de-couples the process speed from wire size.

The short wavelength UV radiation, the heat provided by the IR radiation, visible radiation and convection heat are used to cure the coating on the magnet wire. While visible radiation, infrared radiation and convective heat are considered waste energy in most curing processes, the present invention utilizes these forms of energy generated by the bulb 6 in curing the wire coating.

Although the present invention has been described in an application for curing the coatings on magnet wires, it should be understood that the present invention would be also applicable to other curing applications involving wire-like elements that require the general characteristics provided by the UV oven disclosed herein.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. UV oven for curing coatings on wire-like elements, comprising:

a) a compact longitudinal elliptical reflector with first and second focal lines;

b) a longitudinal bulb disposed along said first focal line that generates short wavelength UV radiation and IR radiation to cure the coating on wire-like elements that are passed through said second focal line; and c) said reflector including an inside surface coated with material to enhance the reflectivity of the short wavelength UV and IR radiation.

2. UV oven as in claim 1, wherein said reflector has major and minor diameters of approximately 92.2 mm and 71.6 mm, respectively.

3. UV oven as in claim 1, wherein said reflector includes slots disposed at the top and bottom to allow coolant to enter said reflector to cool said bulb.

4. UV oven as in claim 1, wherein said material enhances reflection below 250 nm and 400–800 nm range.

5. UV oven as in claim 1, wherein said bulb includes a fill suitable to produce short wavelength UV radiation.

6. UV oven as in claim 5, wherein said fill includes mercury and argon.

7. UV oven as in claim 1, wherein said bulb includes a fill to enhance generation of UV power in 200–250 nm range.

8. UV oven as in claim 1, wherein said bulb is made from quartz material that transmits approximately from below 180 nm.

9. UV oven as in claim 1, wherein said bulb has an inside diameter of 15 mm.

10. UV oven as in claim 1, wherein:

a) said reflector includes first and second portions separated from each other by a distance such that a third focal line in respect of said first and second portions is equidistant to said first and second focal lines; and b) another longitudinal bulb disposed along said second focal line that generates short wavelength UV and IR radiation, whereby the wire-like elements passed through said third focal line are subjected to the energy output of said bulb and said another bulb.

11. UV oven for curing coatings on wire-like elements, comprising:

a) a compact longitudinal elliptical reflector with first focal line;

b) a longitudinal bulb disposed along said first focal line that generates short wavelength UV radiation, IR radiation, visible radiation and heat to cure the coating on wire-like elements that are passed through near said bulb;

c) said reflector including an inside surface coated with material to enhance the reflectivity of the short wavelength UV and IR radiation; and d) a back reflector disposed in close proximity to said bulb and directed toward said bulb such that the wire-like elements passed between said bulb and said back reflector get irradiated from reflected radiation from said back reflector.

12. UV oven as in claim 11, wherein said reflector has major and minor diameters of approximately 92.2 mm and 71.6 mm, respectively.

13. UV oven as in claim 11, wherein said material enhances reflection below 250 nm and 400–800 nm range.

14. UV oven as in claim 11, wherein said back reflector includes a coating that enhances reflection below 250 nm and 400–800 nm range.

15. UV oven as in claim 11, wherein said bulb includes a fill suitable to produce short wavelength UV radiation.

16. UV oven as in claim 15, wherein said fill includes mercury and argon.

17. UV oven as in claim 11, wherein said bulb includes a fill to enhance generation of UV power in 200–250 nm range.

18. UV oven as in claim 11, wherein said bulb is made from quartz material that transmits approximately from below 180 nm.

19. UV oven as in claim 11, wherein said bulb has an inside diameter of 15 mm.

* * * * *